E. R. CASE.
SAFETY DEVICE FOR HEAVIER THAN AIR BODIES.
APPLICATION FILED FEB. 25, 1918.
1,341,783. Patented June 1, 1920.
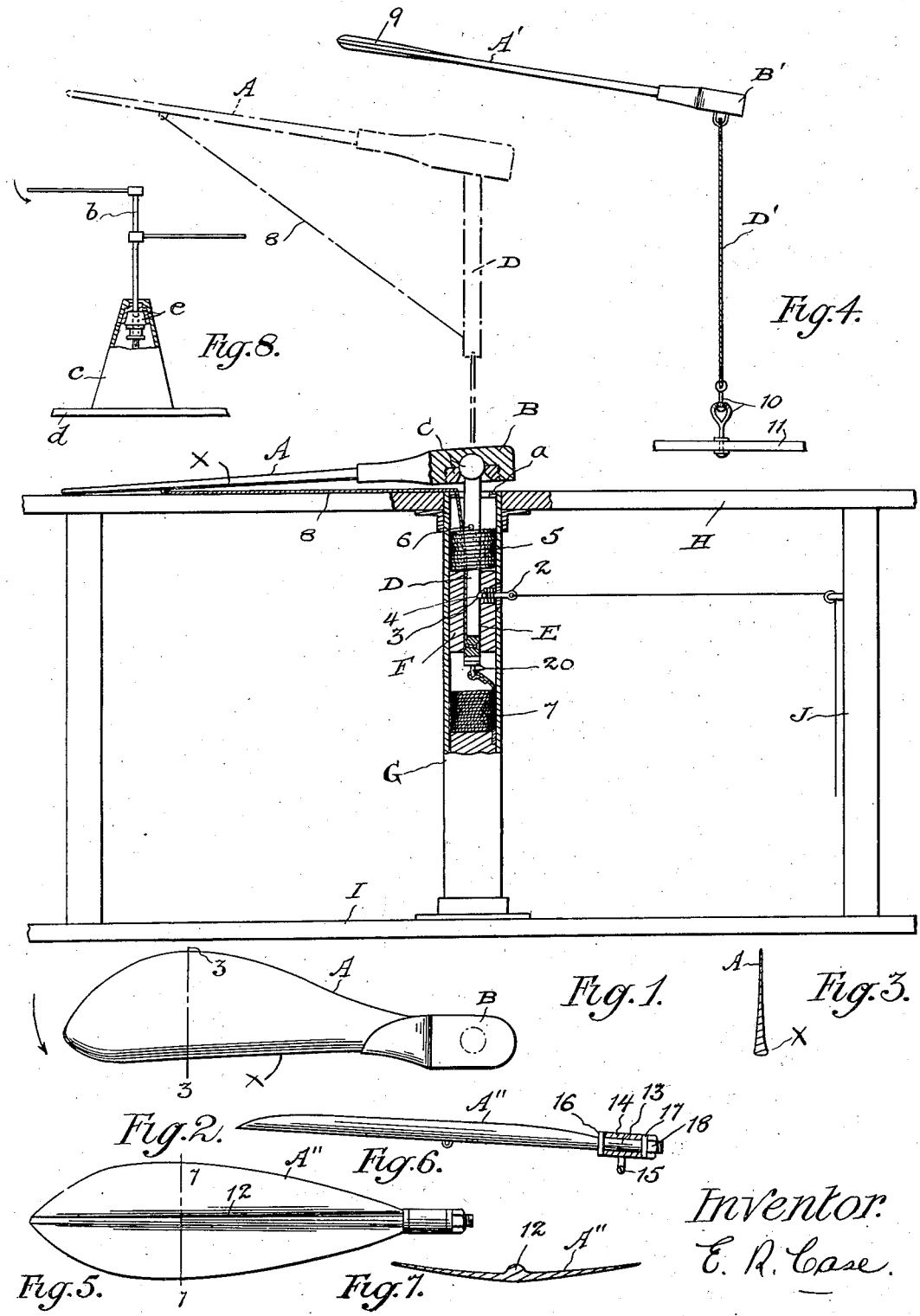

UNITED STATES PATENT OFFICE.

EGERTON RYERSON CASE, OF TORONTO, ONTARIO, CANADA.

SAFETY DEVICE FOR HEAVIER-THAN-AIR BODIES.

1,341,783.   Specification of Letters Patent.   Patented June 1, 1920.

Application filed February 25, 1918. Serial No. 219,021.

*To all whom it may concern:*

Be it known that I, EGERTON RYERSON CASE, a subject of the King of Great Britain, of the city of Toronto, in the county of York, Province of Ontario, Dominion of Canada, have invented certain new and useful Improvements in Safety Devices for Heavier-Than-Air Bodies, of which the following is a specification.

This invention relates to improvements in safety devices for heavier-than-air bodies, and relates more particularly to the production of an automatic safety device for use in connection with heavier-than-air aeroplanes of all types, and the objects of the invention are: (*a*) to enable the aviator to right an aeroplane in case of capsizal, by causing a drag or retarding force to act above the same after the manner hereinafter stated; (*b*) in case the aviator loses complete control of his aeroplane, to retard the descent thereof, the dynamically buoyant power of the safety device automatically varying as the rate of descent of the falling body may vary, so as to prevent serious injury to the aviator and the destruction of the more important parts of the aeroplane; (*c*) to permit an aviator to effect a landing in emergency, quicker than can now be done by volplaning, and (*d*) to permit an aviator to maneuver more quickly substantially vertically downward and so enable him to gain a point of vantage in respect of a hostile aeroplane.

This specification will describe various embodiments within the invention, and what is claimed as new will be pointed out in the claims.

Figure 1 is a view of a portion of a biplane, showing a support in central vertical section illustrating a suitable manner of combining a device within this invention, therewith, a portion of which device is also shown in section; Fig. 2 is a plan view of the preferred form of blade or wing unmounted; Fig. 3 is a cross section on the line 3—3, Fig. 2, showing diagrammatically approximately the shape of the preferred form of the blade or wing of the device; Fig. 4 is a view of a modified form of the device with a modified coupling means therefor; Fig. 5 is a plan view of an alternative form of blade or wing within this invention; Fig. 6 is a side elevation thereof, certain parts shown in section; Fig. 7 is a cross section on the line 7—7, Fig. 5, showing diagrammatically approximately the shape of this alternative form, and Fig. 8 is a view showing two blades or wings attached to a common coupling element and spaced apart, one above the other, and positioned in opposite directions.

In the drawings, like characters of reference refer to the same parts.

As far as has been ascertained after very careful inquiry, no positive means is in use to effect the objects in view of this invention, after the manner set forth and although the specification and drawings disclose a suitable embodiment of the generic conception, and alternative forms thereof, it must be understood that the said disclosures are merely illustrative. Obviously, the generic conception may be combined with all types of heavier-than-air aeroplanes, suitable modifications for mounting being provided where necessary, and it will be understood that as many of the said devices may be used with any given aeroplane, at the desired locations, as may be required to effect the object in view.

A device within my invention comprises a suitable blade or wing A, which is coupled after any suitable manner to the aeroplane. The preferred construction for coupling the said blade or wing to an aeroplane is to provide the same with a hub B having any suitable type of universal joint such as a ball-and-socket joint C in combination with a rod D, which rod normally extends through the bore E of the core F secured to or formed a part of the chambered support G which, in the construction shown, couples the planes H and I together in combination with other suitable supports J. Obviously the blade or wing should be coupled to the aeroplane in such a manner as to allow it to readily assume any desirable position.

In the illustration shown in Fig. 1, the blade or wing is supposed to rest on the upper plane H, and to maintain it in that position, the rod D is locked within the support G by any suitable means, such as a spring-provided bolt 2 of a well-known form, the inner end 3 of which rests in the notch 4 formed in the rod D. When it is desired to bring the device into action, the bolt 2 is withdrawn, and by reason of the coiled spring 5 held under compression between the pin 6 and the upper end of the core F, the blade or wing is shot into approximately the position illustrated by dotted lines, far enough away from the plane H to insure it a good clear field for effective operation. The said rod D is anchored to the support G by any suitable flexible coupling 7, which is paid out as the rod D is shot from the said support. To prevent the loss of the spring 5, a ring $a$, is mounted in the open end of the support G, forming a flange against which the spring will come in contact. Obviously, in order to insure the maximum efficiency of the device, the blade or wing A must offer the maximum resistance to the air. One way of maintaining the said blade or wing at an efficient angle is to couple the same by a flexible coupling 8 to the rod D. Another way to insure the efficient position of the operating blade or wing, for example the blade or wing A′, is to provide it with a weight 9 approximately in the position shown.

The preferred shape of the blade of the device is shown in Fig. 2, and it will be understood that by reason of the friction of the air, as the aeroplane descends the blade or wing A will be rotated in the direction indicated by arrow and so retard the rate of fall.

The preferred form of wing or blade A is provided with a rib or stiffened edge X and tapers toward the opposite side as shown diagrammatically in Fig. 3.

In place of using the universal joint before described, the end or hub B′, of the blade or wing A′ may be coupled by a flexible coupling D′ to a swivel-coupling 10, carried by any suitable portion 11, of an aeroplane. This form of device will also have a rotary motion, though it is probable that the helix described thereby will be of greater diameter than the helix described by the blade or wing A, resulting possibly in a greater retarding power.

The alternative form of blade or wing illustrated in Figs. 5 to 7, is not designed to rotate or revolve but is designed to have a wabbling or teetering movement on its longitudinal axis, somewhat after the manner of a falling kite. Let 12 represent the longitudinal axis of the blade A″, and in order to mount this blade so that it may have the desired movement, the inner end 13 of the axis is mounted to have easy movement within a sleeve 14 provided with a coupling element 15 whereby the blade may be coupled to an aeroplane. 16 is a flange or equivalent element carried by the axis 12 adjacent one end of the sleeve 14, and this flange coöperates with a washer 17, positioned between the sleeve 14 and the nut 18 screwed on the outer threaded end of the axis 12, to prevent longitudinal displacement of said axis in said sleeve. It will be observed that this form of blade is substantially composed of two blades or wings A laterally coupled together, and it may be maintained in the required operative position by any suitable means, as will be understood.

In Fig. 8, is illustrated a pair of blades or wings as suitably mounted on a shaft $b$, which is driven by any suitable motor $c$, carried by the plane $d$. Any suitable type of friction clutch $e$, should be combined with the shaft $b$, so that the blades or wings may be uncoupled from the engine so as to be free to rotate on the shaft $b$, to retard the descent of the helicopter. I know it is old in the art to mount two blades on a propeller shaft, and to disconnect this shaft from the engine to permit the blades to be rotated as the body falls, but I have utilized Fig. 8 to show that it is possible for me to mount two or more blades or wings on a coupling member, and spaced sufficiently apart to permit them to positively functionate. Under certain conceivable conditions, one blade or wing may cause the member coupling the same to the falling body to sway too much, and this swaying motion, if undesirable, can be counterbalanced by another blade or wing mounted on the flexible coupling, and in such a manner as to move in a direction opposite to that of the other blade or wing.

To one skilled in this art, it will be obvious that a device within this invention may be so connected to the aeroplane that during the descent thereof, the upward pull thereagainst of the device can be so located as to maintain the planes substantially in horizontal position and so largely assist in retarding rate of fall.

Obviously, the device will be made as light as possible consistent with strength and performance of function, in accordance with modern practice, and it is self-evident that many various ways may be designed to provide for the release of the device either through the volition of the aviator or otherwise.

It is believed that no structural difficulties are in the way of the use of the invention, and it is reasonable to suppose that the use of an aeroplane equipped therewith, will give the aviator-in-training, a sense of security now obviously lacking.

The flexible coupling 7 is shown as connected by a swivel-coupling 20 to the rod D, so that this coupling 7 may not turn therewith. Obviously, the flexible coupling 8 may be coupled in like manner to the rod D so that the blade A and this coupling will rotate around the axis of the rod D.

Any heavier-than-air body, not classed as an aeroplane, such as an observer doing duty in a basket suspended from a captive balloon, may utilize my device for the purpose of safe descent.

In dropping or delivering mail-matter and packets from aeroplanes, this device will be very efficient.

The dynamically buoyant power of a device within my invention, as disclosed in this application, will be automatically adjusted to the rate of fall of the heavier-than-air body to effect the purpose in view.

In this specification and the claims forming part thereof, the word "gyrating" is used to indicate the mode of operation of the wing or blades A and A', as well as that of the wing or blade A.

Claims:

1. The combination with a heavier-than-air body, of a gyratable device suitably shaped to offer resistance to the air, and means whereby said device is actively associated with said body and assumes the most efficient angle to the vertical while it is caused to gyrate by the air resistance when said body falls, and so develop dynamically buoyant power which may automatically vary as the rate of the descent of the said falling body may vary.

2. The combination with a heavier-than-air body, of a gyratable device suitably shaped to offer resistance to the air, and flexible means whereby said device is actively associated with said body and assumes the most efficient angle to the vertical while it is caused to gyrate by the air resistance when said body falls, and so develop dynamically buoyant power which may automatically vary as the rate of the descent of the said falling body may vary.

3. The combination with a heavier-than-air body, of a gyratable hub-provided blade-like device, and means whereby said device is actively associated directly through the medium of its hub with said body and assumes the most efficient angle to the vertical while it is caused to gyrate freely around the axis of the said hub by the air resistance when said body falls, and so develop dynamically buoyant power which may automatically vary as the rate of the descent of the said falling body may vary.

4. The combination with a heavier-than-air body, of a gyratable hub-provided blade-like device; flexible means whereby said device is actively associated directly through the medium of its hub with said body, and means to retain said device at the most efficient angle to the vertical when it is caused to gyrate freely around the axis of the said hub by the air resistance when said body falls, and so develop dynamically buoyant power which may automatically vary as the rate of the descent of the said falling body may vary.

5. The combination with a heavier-than-air body, of a gyratable hub-provided blade-like device; flexible means whereby said device is actively associated directly through the medium of its hub with said body, and a flexible stay coupling said device to said flexible coupling means to retain said device at the most efficient angle to the vertical when it is caused to gyrate freely around the axis of the said hub by the air resistance when said body falls, and so develop dynamically buoyant power which may automatically vary as the rate of the descent of the said falling body may vary.

6. The combination with a heavier-than-air body, of a gyratable device suitably shaped to offer resistance to the air; means whereby said device is actively associated with said body and assumes the most efficient angle to the vertical while it is caused to gyrate by the air resistance when said body falls, and so develop dynamically buoyant power which may automatically vary as the rate of the descent of the said falling body may vary, and means whereby said device and its said associated means may be suddenly launched into the air.

7. The combination with a heavier-than-air body, of a gyratable samara-shaped device, and means whereby said device is actively associated with said body and assumes the most efficient angle to the vertical while it is caused to gyrate by the air resistance when said body falls, and so develop dynamically buoyant power which may automatically vary as the rate of the descent of the said falling body may vary.

8. In combination, a gyratable device suitably shaped to offer resistance to the air; a coupling element, and means whereby said device is actively associated with said coupling element, and assumes the most efficient angle to the vertical while it is caused to gyrate by the air resistance when attached to a falling body by said coupling element and so develop dynamically buoyant power.

9. The combination with a heavier-than-air body, and a fall-resisting blade gyratable by air resistance, of means flexibly operatively connecting said blade to said body whereby said blade is free to be automatically gyrated by the air resistance when said body falls to automatically resist the fall of the body in proportion to the rate of speed of the fall thereof.

10. The combination with a heavier-than-air body, and a fall-resisting blade gyratable by air resistance, of means flexibly operatively connecting said blade to said body whereby said blade is free to be automatically gyrated by the said resistance when said body falls to automatically resist the fall of the body in proportion to the rate of speed of the fall thereof, and means to maintain said blade at the most efficient angle to the vertical.

11. The combination with a heavier-than-air body, of a blade means flexibly operatively connected to the body and freely gyratable by the air resistance when said body falls to automatically retard the descent of said body in proportion to the rate of speed of such descent.

12. The combination with a heavier-than-air body, of a blade means flexibly operatively connected to the body and freely gyratable by the air resistance when said body falls to automatically retard the descent of said body in proportion to the rate of speed of such descent, means to retain said blade in an inoperative position relative to the body and means to release said retaining means.

13. The combination with a heavier-than-air body, of a blade means flexibly operatively connected to the body and freely gyratable by the air resistance when said body falls to automatically retard the descent of said body in proportion to the rate of speed of such descent, means to retain said blade in an inoperative position relative to the body, means to release said retaining means, and means to project said blade means from its inoperative position.

EGERTON RYERSON CASE.